Figure 1:
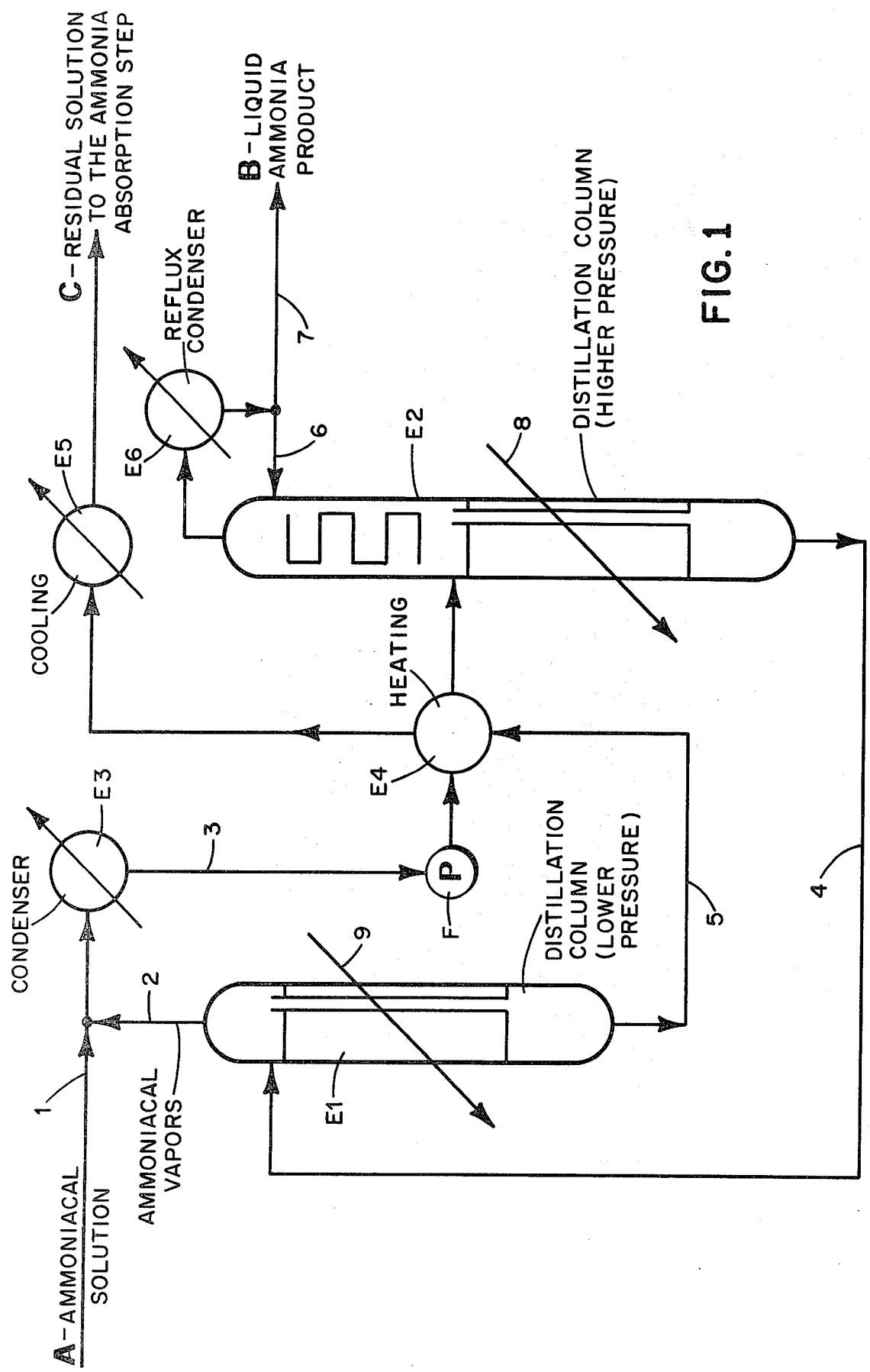

United States Patent [19]

Pagani et al.

[11] 4,318,782

[45] Mar. 9, 1982

[54] PROCESS FOR DISTILLING AMMONIACAL SOLUTIONS

[75] Inventors: Giorgio Pagani, Milan; Fabrizio Socci, Peschiera Borromeo, both of Italy

[73] Assignee: Montedison S.p.A., Milan, Italy

[21] Appl. No.: 222,989

[22] Filed: Jan. 6, 1981

[30] Foreign Application Priority Data

Jan. 8, 1980 [IT] Italy ................................ 19075 A/80

[51] Int. Cl.³ .............................................. B01D 3/28
[52] U.S. Cl. ........................................ 203/12; 203/20; 203/75; 203/77; 203/78; 203/80; 203/82; 203/84; 203/93; 203/94; 203/98; 423/352
[58] Field of Search .................... 423/352; 203/12, 21, 203/22, 23, 25, 27, 71, 72, 73, 74, 75, 77, 78, 80, 81, 82, 84, 89, 91, 93, 94, 98

[56] References Cited

U.S. PATENT DOCUMENTS 2,501,326  3/1950  Gilmore ................................ 203/12
2,519,451  8/1950  Fulton ................................... 203/12

*Primary Examiner*—Frank Sever
*Attorney, Agent, or Firm*—Stevens, Davis, Miller & Mosher

[57] ABSTRACT

A process for distilling ammoniacal solutions is disclosed comprising the utilization of two distillation columns operating at different pressures, the ammoniacal solution to be distilled being sent—after being mixed with the ammoniacal vapors flowing from the top of the column operating at the lower pressure—to the column operating at the higher pressure, from the bottom of which the partially distilled ammoniacal solution is sent to the column operating at the lower pressure; the liquid ammonia being recovered at the top of the column operating at the higher pressure while the residual ammoniacal solution is withdrawn from the bottom of the column operating at the lower pressure.

6 Claims, 2 Drawing Figures

PROCESS FOR DISTILLING AMMONIACAL SOLUTIONS

This invention relates to a process for distilling ammoniacal solutions.

In ammonia synthesis systems, particularly those operating at low pressure, for example at a pressure lower than 100 kg/cm² abs., it is known to carry out the separation of the ammonia contained in the reacted gases through absorption with water. In this way it is possible to obtain an ammoniacal solution having an ammonia concentration of about 40% by weight. This solution can be easily distilled according to conventional techniques so as to obtain from the distillation column, usually operating at an absolute pressure of 17-18 kg/cm², liquid ammonia at 40° C. at the top and an ammoniacal solution at 10% by weight of ammonia at the bottom.

One practical drawback of this operation is the relatively high thermal level of the heat necessary to distill the ammoniacal solution (for example, temperatures of 200° C. and above).

It is an object of this invention to provide a process for distilling ammoniacal solutions, which permits one to effect the distillation at remarkably lower thermal levels, for example at temperatures not exceeding 130°-140° C., thereby permitting one to utilize heat recovery at low thermal levels, which is generally abundantly available in the modern ammonia production systems.

This and still other objects, which will more clearly appear to one skilled in the art from the detailed description given below, are advantageously achieved by a distillation process for ammoniacal solutions which, according to the present invention, comprises the use of two distillation columns operating at different pressures, the ammoniacal solution to be distilled being sent—after being mixed with the ammoniacal vapors flowing from the top of the column operating at the lower pressure—to the column operating at the higher pressure, from the bottom of which the partially distilled ammoniacal solution is made to flow to the column operating at the lower pressure; the liquid ammonia being recovered at the top of the column operating at the higher pressure, while the residual ammoniacal solution is withdrawn from the bottom of the column operating at the lower pressure.

The maximum distillation pressure (i.e., the higher pressure) depends on the temperature of the cooling water available and, on the average, it is about 17-18 kg/cm² abs.

The minimum pressure (i.e., the lower pressure) depends on the thermal level of the heat available, on the final concentration of the ammoniacal solution to be obtained, and also on the temperature of the cooling water; on the average, a pressure of about 5 kg/cm² abs. can be considered as optimum, although this value may vary from case to case.

Figure 2:
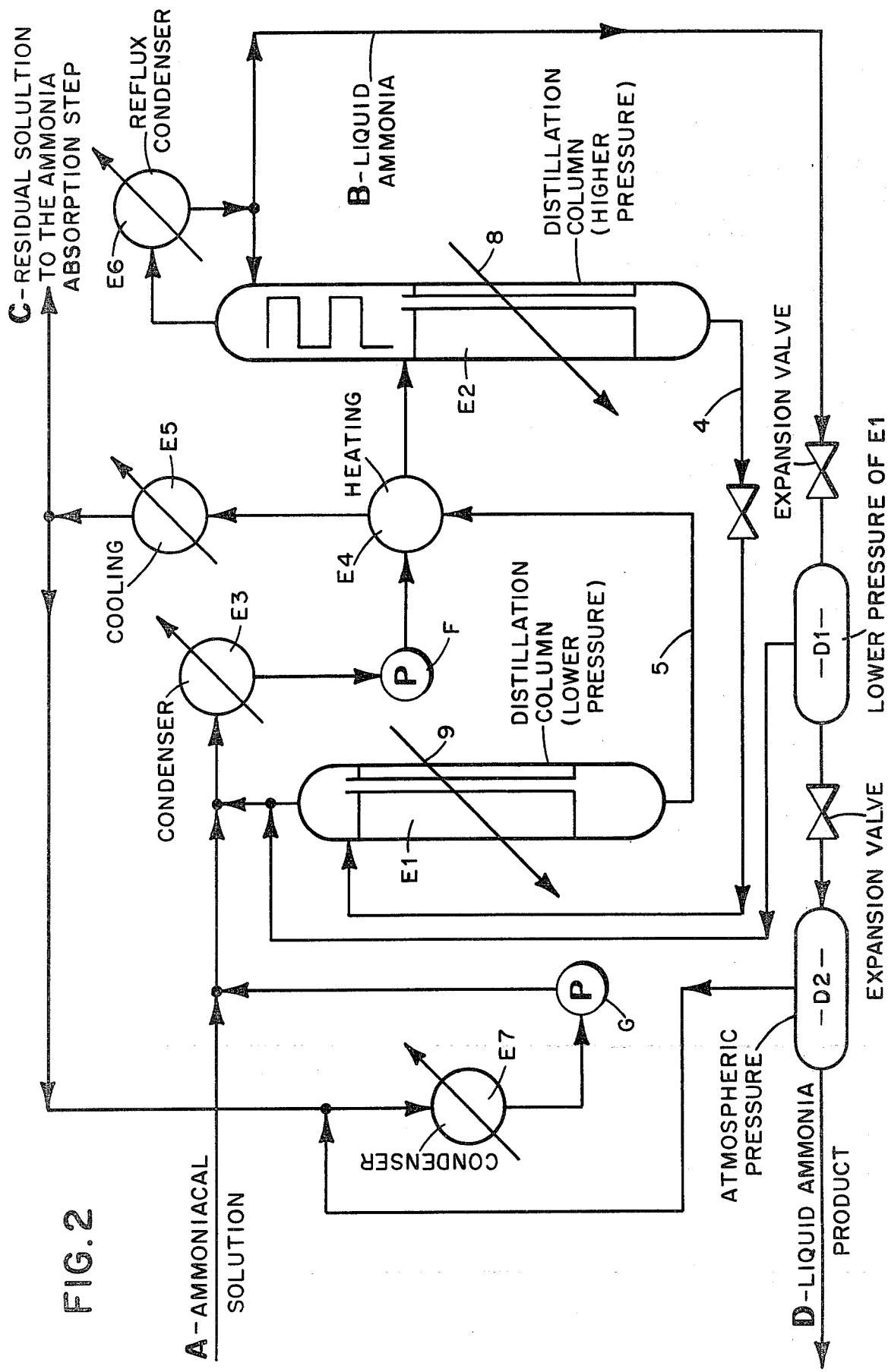

The present invention will now be described in more detail by making reference to the attached drawings in which:

FIG. 1 shows schematically an embodiment of the invention with recovery of liquid ammonia at room temperature; and FIG. 2 shows schematically another embodiment of the invention with recovery of refrigerated liquid ammonia.

Referring now to FIG. 1, aqueous ammoniacal solution A to be distilled, after mixing with the ammoniacal vapors flowing from the top of column E1 operating at a pressure lower than that of column E2, is expanded and conveyed to condenser E3 (preferably of the downflowing-film type), in which the vapors are condensed. Column E1 operating at the lower pressure is preferably of the downflowing-film type.

The resulting ammoniacal solution, more concentrated in ammonia than the starting solution, is sent by means of pump F to column E2 operating at a pressure higher than that of E1, after being preheated in exchanger E4 at the expense of the residual ammoniacal solution withdrawn from the bottom of column E1.

In distillation column E2, preferably of the downflowing-film type in its lower section and of the tray type in its upper section, such solution is partially distilled up to an ammonia concentration consistent with the operating pressure and with the maximum temperature level to be attained (for example, 26% of ammonia at 130° C. and 18 kg/cm² abs.).

From the bottom of column E2 the partially distilled ammoniacal solution is sent to column E1 operating at the lower pressure, where its ammonia concentration is reduced to the desired value (for example, to 10% by weight).

The ammoniacal vapors rising in the lower section of column E2 are rectified in the upper section equipped with trays and are condensed in reflux condenser E6, in order to obtain liquid ammonia B at 99.9% by weight.

Residual solution C, coming from the bottom of column E1, after heat recovery in E4 and final cooling in E5, is conveyed back to the ammonia absorption step in an ammonia synthesis system which may be of a conventional type.

The ammoniacal vapors released in column E1 are mixed, as already mentioned, with the ammoniacal solution A to be distilled.

Thanks to the above-illustrated cycle it is possible to distill the ammoniacal solution while supplying heat at a low thermal level (for example, at temperatures of about 130° C.). The use of film type distillation columns permits one not only to cause the heat and substance exchange to occur on one surface only, but also (which is very important) to supply heat in countercurrent at means levels lower than the maximum distillation temperature.

8 and 9 indicate the inputs of the heat at low thermal levels which are supplied to columns E2 and E1, respectively.

In many cases, it is also necessary to produce, for storage requirements, liquid ammonia refrigerated at $-33°$ C. and at atmospheric pressure. In such cases the preferred distillation cycle is that illustrated in FIG. 2, in which the same indices as in FIG. 1 indicate similar parts.

Referring now to FIG. 2, liquid ammonia B recovered from the top of column E2 operating at the higher pressure is expanded through conventional expansion valves in two stages in the two tanks D1 and D2, the former being balanced with the pressure of column E1 and the latter with the atmospheric pressure.

The vapors evolved in stage or tank D1 are mixed with ammoniacal solution A to be distilled and are then condensed in condenser E3, while the vapors evolved in stage D2 are mixed with a part of residual solution C and then condensed in a condenser E7 which, by means of pump G, are then mixed with ammoniacal solution A to be distilled.

The refrigerated liquid ammonia is recovered in D.

The following numerical example is given for illustrative purposes and in order still better to illustrate the present invention, without however being any limitation thereof.

With reference to the scheme of FIG. 1, 10,000 kg of an ammoniacal solution at 40% by weight of ammonia were to be distilled.

Condenser E3 was fed with:
ammoniacal solution A to be distilled (line 1) having the following composition:
water: 6,000 kg
ammonia: 4,000 kg
the ammoniacal vapors coming from distillation column E1 (line 2) having the following composition:
water: 207 kg
ammonia: 1,516 kg At the outlet of condenser E3 (line 3) 11,723 kg of ammoniacal solution having the following composition were obtained:
water: 6,207 kg
ammonia: 5,516 kg This solution was sent, by means of pump F and after preheating up to 65° C. in exchanger E4, to distillation column E2 at the higher pressure to which (via 8) an amount of heat was supplied equal to $2.02.10^6$ kcal at such a thermal level as to reach, at the bottom of the column, a temperature of 130° C. at an absolute pressure of 18 kg/cm$^2$.

At the bottom of column E2 (line 4) a partially-distilled solution at 26% by weight of ammonia having the following composition was obtained:
water: 6,207 kg
ammonia: 2,183 kg The vapors rich in ammonia flowing up to the lower section of column E2 were concentrated in the upper section equipped with trays, to which a reflux of 1,000 kg of liquid ammonia (provided by the reflux condenser E6) flowed.

The partially-distilled solution flowing from E2 (line 4) was sent to distillation column E1 operating at the lower pressure, where, by expansion, it was further distilled by means of heat. To this column an amount of heat equal to $0.46 . 10^6$ kcal was supplied via 9, thereby obtaining from the bottom of the column (via line 5) a residual solution at a temperature of 125° C. and at an absolute pressure of 5 kg/cm$^2$, having the following composition:
water: 6,000 kg
ammonia: 667 kg From condenser E6, besides a reflux of 1,000 kg of ammonia returned to the column E2 via line 6, 3,333 kg of liquid ammonia at 40° C. (line 7) were obtained as distillation product.

The advantages of the present invention clearly appear from the preceding description.

The distillation process of the present invention may be applied to aqueous ammoniacal solutions originating from any source. However, it is especially advantageous when applied to aqueous ammoniacal solutions as obtained from a process for synthesizing ammonia from hydrocarbons as described and claimed in the companion Pagani et al application Ser. No. 222,988 filed of even date herewith, corresponding to Italian Application No. 19076 A/80 (Case A. 2808).

What is claimed is:

1. A process for distilling ammoniacal solutions, comprising, providing a first column of a first design and a second column of a second design, each operating at different pressures, the ammoniacal solution to be distilled being sent, after being mixed with the ammoniacal vapors flowing from the top of the first column operating at the lower pressure, to the second column operating at the higher pressure, from the bottom of which the partially-distilled ammoniacal solution is conveyed to the first column operating at the lower pressure; liquid ammonia being recovered at the top of the second column operating at the higher pressure, while the residual ammoniacal solution is withdrawn from the bottom of the first column operating at the lower pressure; said first and second designs co-acting to enable operation of said process at or below thermal levels of 140° C.

2. A process according to claim 1, characterized in that the ammoniacal solution to be distilled, mixed with the ammoniacal vapors flowing from the top of the first column operating at the lower pressure, is subjected to condensation, preferably in a condenser of the down-flowing-film type, before being sent to the second column operating at the higher pressure.

3. A process according to claim 1, characterized in that the ammoniacal solution to be distilled, mixed with the ammoniacal vapors flowing from the top of the first column operating at the lower pressure, is preheated, before being sent to the second column operating at the higher pressure, by the residual solution withdrawn from the bottom of the first column operating at the lower pressure.

4. A process according to claim 1, characterized in that the liquid ammonia recovered at the top of the column operating at the higher pressure is caused to expand, thereby obtaining refrigerated liquid ammonia, while the vapors evolved by said expansion are mixed, optionally after condensation, with the ammoniacal solution to be distilled.

5. A process according to claim 1, characterized in that the liquid ammonia recovered at the top of the column operating at the higher pressure is made to expand in two stages, the former balanced with the pressure of the column operating at the lower pressure and the latter balanced with the atmospheric pressure; the vapors evolved in the first expansion stage being mixed with the ammoniacal solution to be distilled while the vapors evolved in the second expansion stage, mixed with a part of the residual solution withdrawn from the bottom of the column operating at the lower pressure, are condensed and mixed with the ammoniacal solution to be distilled.

6. A process according to claim 1, characterized in that the first column operating at the lower pressure is of the film type, while the second column operating at the higher pressure is of the film type in its lower section and of the tray type in its upper section.

* * * * *